United States Patent [19]

Adey

[11] 4,333,263
[45] Jun. 8, 1982

[54] ALGAL TURF SCRUBBER

[75] Inventor: Walter H. Adey, McLean, Va.

[73] Assignee: The Smithsonian Institution, Washington, D.C.

[21] Appl. No.: 194,726

[22] Filed: Oct. 7, 1980

[51] Int. Cl.³ .............................................. A01G 7/00
[52] U.S. Cl. ............................................ 47/1.4; 56/9; 210/620
[58] Field of Search .................................. 47/1.4, 59; 210/601–632; 56/9

[56] References Cited

U.S. PATENT DOCUMENTS

| 2,983,076 | 5/1961 | Merrill | 47/59 |
| 3,402,506 | 9/1968 | Renfro | 47/59 |
| 3,691,737 | 9/1972 | Hodgson | 56/9 |
| 3,768,200 | 10/1973 | Klock | 47/1.4 |
| 4,209,943 | 7/1980 | Moeller et al. | 47/1.4 |
| 4,235,043 | 11/1980 | Harasawa et al. | 47/1.4 |
| 4,236,349 | 12/1980 | Ramus | 47/1.4 |
| 4,259,828 | 4/1981 | Pace | 56/9 |

FOREIGN PATENT DOCUMENTS 743644  6/1980  U.S.S.R. ................................ 47/1.4

Primary Examiner—Robert E. Bagwill
Attorney, Agent, or Firm—Sughrue, Mion, Zinn, Macpeak & Seas

[57] ABSTRACT

A method of producing an algal turf for use as a scrubber of carbon dioxide, nutrients and pollutants as well as biomass production is disclosed. A growing surface for spores or benthic microalgae is provided on a water surface. The growing surface is subjected to periodic water surge action to promote metabolite cellular-ambient water exchange and light is provided, natural or artificial to promote growth. The growing turf is harvested before being overgrown by larger macroalgae.

9 Claims, 6 Drawing Figures

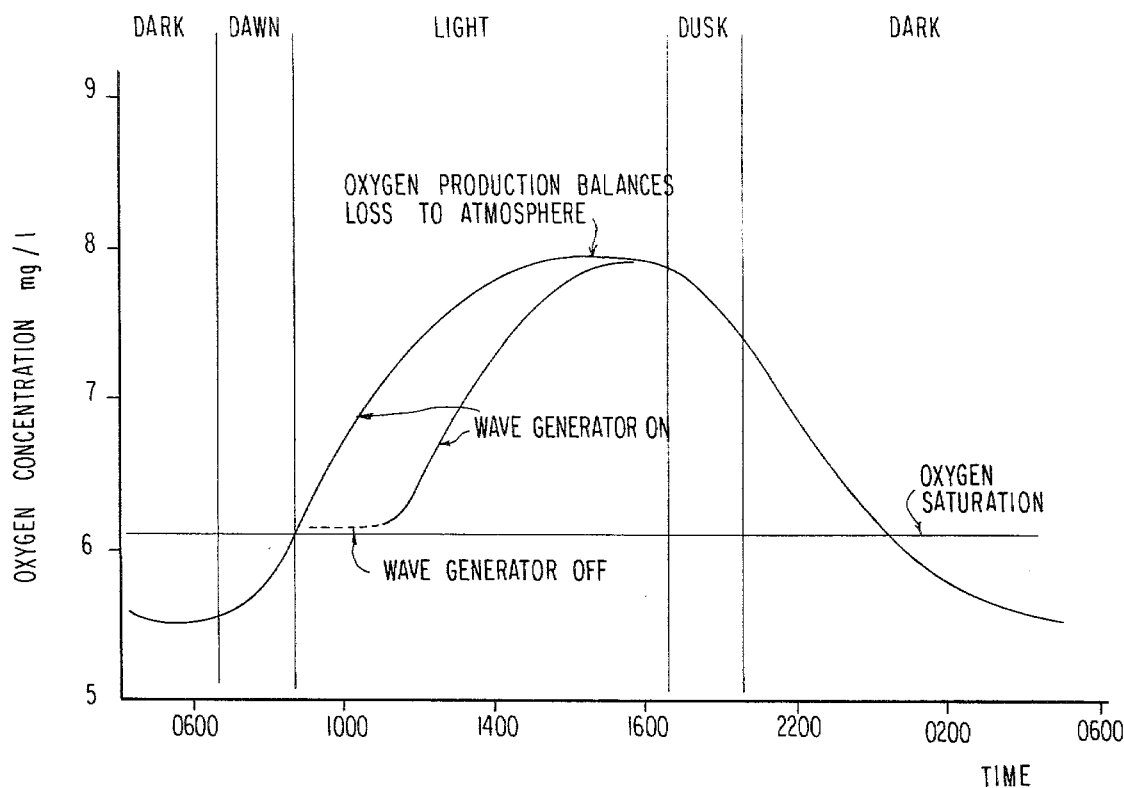
FIG.2
FIG.3
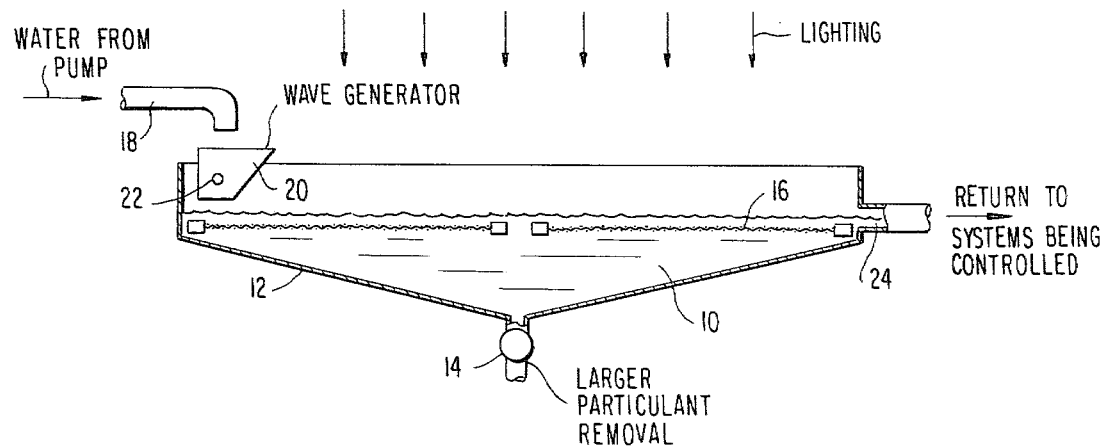

ALGAL TURF SCRUBBER

BACKGROUND OF THE INVENTION

This invention relates to the creation and harvesting of algal turf. Such turf may be grown under natural or artificial light in a regime utilizing repetitive water motion. Such turfs are known to be efficient scrubbers of carbon dioxide, nutrients and a variety of pollutants found in natural or waste water. As a result of the scrubbing action, such turfs may produce biomass and oxygen to a certain degree. They also raise the pH of the water, and under low nutrient conditions can be used to fix nitrogen.

Accordingly, algal turf scrubbing can potentially be used for a variety of applications. For example, the scrubbers can be used to replace the biological or bacteriological filters in aquaria. Scrubbers can also be used to remove nutrients and other contaminants from polluted waters. Finally, by harvesting the algal mass, the technique can be used to produce biomass as an energy source, as a fertilizer or as a human or an animal food supplement.

Studies in algal turf production are well known and reported in the literature. For more than 20 years, tropical reefs have been acknowledged to be among the most productive of natural systems. For example, in Lewis, "Processes of Organic Production on Coral Reefs", pp. 305–347, 52 Biol. Rev. (1977), production values as found, for example, on page 312 therein, indicate that coral reefs are among the highest producers in primary production values for pelagic, benthic and terrestrial ecosystems. Notwithstanding the values demonstrated in some earlier literature, recent efforts have demonstrated that those estimates of reef primary productivity were conservative. The mean reported value, 10.3 $gC/m^2/day$ should be contrasted to values ranging from 19.2 to 32.7 $gC/m^2/day$ in a 1980 study referring to St. Croix reefs. Such recent studies have demonstrated that algal turfs in conjunction with wave surge have been identified as the primary source of most reef productivity.

Within this technology it has been known that the removal or severe reduction of wave surge motion greatly reduces primary productivity as shown in FIG. 2, a typical daily cycle of oxygen concentration in a reef microcosm. Reef production is accurately measured only near saturation since atmospheric exchange is a factor at higher or lower oxygen concentrations. As shown by the dotted line trace 2 when a wave generator, used in such reef microcosm devices, is stopped, given the same current, light, and nutrient levels, net productivity is nearly zero. In FIG. 2, the lack of an oxygen spike when the wave generator is restarted indicates that greatly reduced production is a real factor as opposed to an apparent condition because storage has not occurred.

Additionally, within the reported literature on research in this technology, there are a number of reports dealing with algae techniques for waste recycling, oceanic farming, or the like. Contemporary research can be grouped in two distinct categories: those utilizing macro algae and those using planktonic algae. In the first group, macro algae reports dealing with waste recycling or the like can be found in Ryther, et al, "Physical Models of Integrated Waste-Recycling Marine Polyculture Systems", Aquaculture, 5, 163–177 (1975); California Institute of Technology, Graduate School, Project "Evaluating Oceanic Farming of Seaweeds As Sources of Organics and Energy", U.S. Department of Energy, Division of Solar Technology, Contract E (04-3)-1275; and Washington State Department of Natural Resources, Project "Aquaculture of Seaweeds on Artificial Substrates", U.S. Department of Commerce, Contract R/A-12. In the case of planktonic algae, Goldman et al, "Relative Growth of Different Species of Marine Algae in Wastewater-Seawater Mixtures", Marine Biology, 28, 17–25 (1974); Karolinska Institutet, "Investigation of an Integrated Aquatic System for Storing Solar Energy in Organic Material", Namnden for Energiproduktionforskning, No. 53 3065 062; and State of Hawaii Natural Energy Institute, "Energy from Algae of Bioconversion and Solid Waste", Hawaii State Government, demonstrate the status of contemporary research using that type of algae.

In either case, research to date has not utilized wave surge motion to enhance the exchange of metabolites between algal cells in the water medium. Also, these known research techniques have not recognized the cruciality of macro algae size, vis-a-vis the shading of one cell by another. Accordingly, such techniques are not suitable for optimum biomass production and the propensity of removing nutrients and other contaminants from polluted waters is severely limited.

SUMMARY OF THE INVENTION

This invention proceeds based on a significant departure in the type of algae which is utilized, by employing micro algae of the major groups of benthic algae. In such algae, the use of attached algal turfs, wherein the simple algae all or most cells are photosynthetic, demands critical attention to wave surge motion. By optimizing such surge motion together with harvesting techniques, metabolite cellular-ambient water exchange is optimized and continuous shading of one cell by an adjacent cell is prevented.

The present invention utilizes algal turfs, dense mats of small anatomically simple algae generally less than several cm in height. The invention utilizes major groups of benthic algae which, in a tropical environment, can be summarized into four major sub-groupings. They are:

Green Algae

Bryopsis
Derbesia
"Smithsonia"—a new genus, perhaps a new order

Brown Algae

Sphacelaria
Giffordia

Red Algae

Jania
Amphiroa
Centroceras
Polysiphonia
Gelidiella
Ceramium
Herposiphonia
Lophosiphonia

Blue-Green Algae

Oscillatoria
Schizothrix

Calothrix
Microcoleus

In the colder waters, turfs are formed by similar or related genera, such as:

Green Algae

Enteromorpha
Ulva
Chaetomorpha
Chadophora

Brown Algae

Ectocarpus
Giffordia
Scytosiphon

Red Algae

Acrochaetium
Ceramium
Polysiphonia

Blue-Green Algae

Oscillatoria
Calothrix

Diatoms

Licmophora
Melosira

The above listings are merely illustrative of some prominent classifications germane to this invention.

Algal turf growth can be achieved in an aqueous environment by providing a suitable vacant area in which spores may settle. The first colonizations are usually microscopic diatoms which are then rapidly dominated by the turf species. In accordance with the present invention, the harvesting of such turfs must occur before they are overgrown in turn by the larger macroalgae. This keeps production rates at a high level and minimizes predation by grazing microorganisms. The rate of harvesting is dependent on light levels, temperature and surge action. Immediate regrowth of the algal turf will occur if the vacant surface or substrate is sufficiently coarse to allow a filamentous base of the algae to remain following harvesting. Typically, such a substrate can be a plastic screen having screen grid dimensions in the range of approximately 0.5 to 5 mm.

Using screens, harvesting can be accomplished by simply scraping the surface or, in the context of artificial growing techniques the screen can be set up for removal for harvesting. In oceanic systems, vessels having retrieval ramps can be used to harvest plates which are moored or otherwise positioned on the ocean surface.

Accordingly, it is an object of this invention to define a technique of algal turf scrubbing utilizing micro algae so that metabolite cellular-ambient water exchange is optimized.

A further object of this invention is to define a method of algal turf scrubbing wherein wave surge motion is used to optimize the exchange of Metabolites between micro algal cells and the water medium.

Yet another object of this invention is to define a technique of algal turf scrubbing for use in aquaria to replace bacteriological filters.

Still another object of this invention is to define a method of algal turf scrubbing utilizing micro algae to remove nutrients and other contaminants from polluted waters.

A further object of this invention is to utilize the technique of micro algal turf scrubbing for the production of biomass.

These and other objects of this invention will become apparent in the description of the preferred embodiments when taken with the attached drawings.

BRIEF DESCRIPTION OF THE DRAWINGS

FIG. 2 is a graph showing oxygen concentration as a function of time, showing the daily cycle of oxygen concentration in a reef microcosm;

FIG. 3 shows an algal turf scrubber used as an aquarian filter; and

DESCRIPTION OF THE PREFERRED EMBODIMENTS

This invention departs from the prior art by utilizing micro algae, anatomically simple, usually less than several cm in height and belonging to all major groups of benthic algae. In accordance with the present invention, some prolific groups for warm water use are indicated below:

| Green algae | Brown algae | Red algae | Blue-green algae |
|---|---|---|---|
| Bryopsis | Sphacelaria | Jania | Oscillatoria |
| Derbesia | Giffordia | Amphiroa | Schizothrix |
| "Smithsonia" | | Centroceras | Calothrix |
| | | Polysiphonia | Microcoleus |
| | | Gelidiella | |
| | | Ceramium | |
| | | Herposiphonia | |
| | | Lophosiphonia | |

In cold water systems the following algal groups are prominent:

| Green algae | Brown algae | Red algae | Blue-green algae | Diatoms |
|---|---|---|---|---|
| Enteromorpha | Ectocarpus | Acrochaetium | Oscillatoria | Licmophora |
| Ulva | Giffordia | Ceramium | Calothrix | Melosira |
| Chaetomorpha | Scytosiphon | Polysiphonia | | |
| Chadophora | | | | |

An important aspect of this invention is the optimization of wave surge motion to enhance the exchange of metabolites between algal cells of the types of algae listed above and the water media. The combination of attached algal turfs utilizing such simple algae wherein nearly every cell is photosynthetic with wave motion is important for metabolite cellular-ambient water exchange.

Wave surge or oscillatory water motion can be obtained in a variety of ways. Clearly, in an oceanic environment, oscillatory water action is a function of wave motion and may or may not be controlled by attached devices. In the context of mechanical wave generators, oscillatory action together with flow rate can be controlled.

Harvesting rates are a function of flow rate, screen or platform size, and lighting intensity. In accordance with the present invention, the use of a screen, preferably plastic, as a growing surface has achieved optimum results. Preferably, the best screen dimensions appear to lie in the range of 0.5 and 5 mm. Lighting to carry out the process may be either natural or artificial, with the intensity in an artificial environment a function of the desired use of the method.

Figure 1:
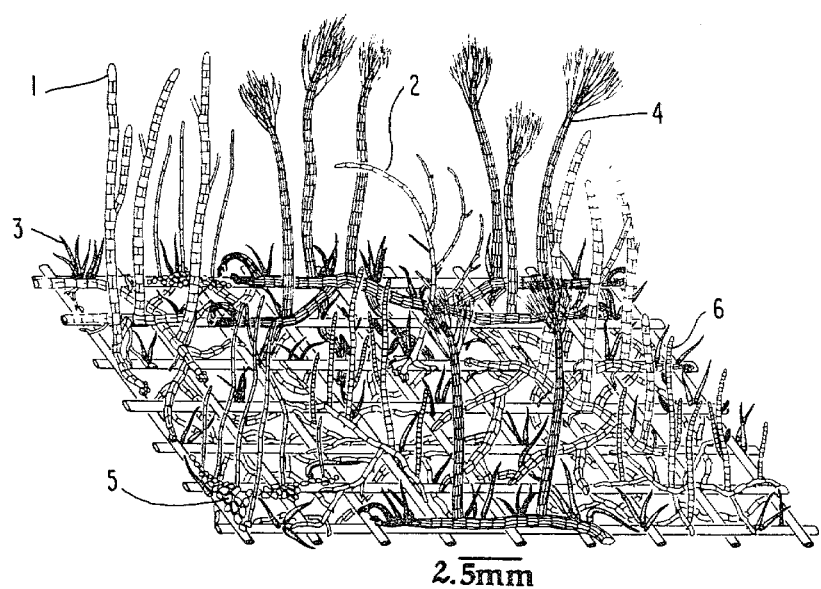
FIG. 1 is a schematic view of an algal turf in accordance with this invention.

FIG. 1 shows a growing surface, typically a screen of 2.5 mm and a typical algal turf. The more prominent algae are (1) sphacelaria, (2) cladophora, (3) calothrix, (4) Herposiphonia, (5) "Smithsonia" and (6) Giffordia. The algal growth of the listed groups is random on the growing surface with wave action passing across and through the turf and enhancing metabolite cellular-ambient water exchange.

Referring now to FIG. 3, one potential application of this invention for use in an aquarium filter is shown. Aquaria have utilized bacteriological filters as a universal tool employed by commercial, research, and lay aquarium operators for the removal of urea, ammonia, and other organic contaminants from aquarium systems. The use of aquarium filters is described in detail in Spotte, "Seawater Aquariums The Captive Environment", John Wiley & Sons, 1979 (Chapter 7, pp. 117, 163). Spotte indicates that the use of filters with macro algae cannot be designed with any degree of predictability. However, in accordance with the present invention utilizing micro algae predictable and reproducible results can be obtained.

Generally, aquarium filters consist of a variety of devices used for trapping organics and providing a large surface area, such as sand, glass, plastic floss, charcoal, etc., for the bacteria which breaks down the organic remains and excretory products to produce reactive nutrients. However, such prior art biological filters consume oxygen, produce $CO_2$ and reduce pH. They also increase reactive nutrient levels and all of these effects are counterproductive to efficient aquarium management. As indicated in Spotte, algal turf under lighted conditions can be used to remove urea and ammonia from ambient water. Additionally, they have the known beneficial effects of releasing $O_2$, consuming $CO_2$ and increasing pH, as well as removing reactive nutrients. While these generally beneficial results have been known, as indicated, to date an effective and practical system for achieving those results has not yet been realized.

A deficiency of macroalgae is that particulate and larger molecular organics cannot be taken up by algae. These materials are normally broken down by bacteria in a water column. However, in some systems where the organic particulate load is especially heavy an algal turf scrubber might be used along with a standard bacterial filter. Also, in accordance with the present invention, in tank systems where larger particulates present difficulties, a settling trap can be used in conjunction with the novel algal turf filter shown in FIG. 3. A settling chamber 10 may be of any convenient size, generally rectangular, having a shallow tapered bottom surface 12 with a settling trap 14 for the use of larger particulate material. As such material settles, it can be selectively removed by the valve forming a part of the trap 14. Disposed in a floating or attached relationship at the water surface is a removable screen 16 having the algal turf thereon. As indicated, the turf should comprise microalgae related or similar to the groups indicated above. The screen is preferably plastic having a grid dimension in the range of 0.5 to 5 mm. The screen is removable from the settling chamber 10 to facilitate scrubbing of the turf as it grows thereon.

Artificial or natural lighting can be used; if artificial light issued, metal halide lighting is most efficient. Fluorescent lamps, of course, can be used as an effective artificial light source.

Water from the aquarium pump is directed from spigot 18 onto a wave generator 20. The wave generator is pivoted about axis 22 so that acting as a the generator, the bucket fills and will tip, that is, rotate about axis 22 to cause wave action on the removable screen. As is apparent, wave generator action is a function of input water volume and the size of the generator bucket 20. An outlet 24 is defined at the opposite end of the settling chamber to return water to the aquarium being controlled. Accordingly, the algal turf scrubber shown in FIG. 3 is disposed as a series element interposed between the aquarium pump and the tank. The outlet 24 may be an adjustable spillway to regulate the flow of water in accordance with pump output.

In accordance with the present invention, the removable screen containing the micro algal turf is used to replace the biological filter in aquarium management. Its use provides freedom from many of the problems which are particularly evident in marine aquarium management. The size of the scrubber utilized, that is screen size, is a function of the particular aquarium and biological load. Since most aquaria are custom designed, optimization of the scrubber for that particular system is a function of initial aquaria design. The use of an algal turf filter design similar to that shown in FIG. 3 will solve most of the problems currently inherent in aquarium management, particularly in salt water systems.

A second important application of the present invention is removal of nutrients and contaminants in polluted waters. Accordingly, this invention finds specific utilization for pollution scrubbing. Municipal, industrial and institutional sewage is generally treated today by processes including sedimentation, bacterial action and chlorination. The net result of such activities for more advanced or tertiary systems is waste water generally free from particulate organics but still high in nutrients. Moreover, the water may still be contaminated by a variety of pollutants such as heavy metals. Within the technology attempts have been made to remove nutrients from waste waters utilizing macro or planktonic algae (Goldman et al, "Inorganic Nitrogen Removal in a Combined Tertiary Treatment Marine Aquaculture System—I. Removal Efficiencies", Water Research, Volume 8, pp. 45-54 (1974)). Such techniques remain experimental in nature and are directed to scrubbing coupled with control of algal growth specifically, for example, by production of shell fish such as oysters used to remove the algae. Results to date have been mixed indicating more or less efficient nitrogen removal but only partial success with respect to phosphorous removal. The removal of phosphorous from polluted water therefore remains a problem.

The present invention achieves such removal by the use of algal turf scrubbing, for example utilizing stepped sluiceways. A surge generator of the type shown in FIG. 3 can be positioned at various step levels to translate the laminer water flow of a stream into surge motion without requiring external energy input. Turf platforms can be placed at various step levels with a particular relationship to the grade to be determined given the fall of the stream. Harvesting of algal turf is simply accomplished by momentarily blocking the flow and raking the screens by hand or utilizing machinery. Accordingly, in such a system utilizing a surge motion generator as a part of the sluiceway efficient removal of nutrients and many other pollutants from waste water can be accomplished. The system would then function as a quaternary system. A secondary benefit is the production of biomass for energy or fertilizer production where noxious pollutants are not present at high levels. Such a technique is adaptable at lower latitudes where natural sunlight is plentiful, however, at moderately high latitudes biomass energy output from the summer season may make partial artificial lighting feasible during winter months. Hence, dependent on overall efficiency of the system, artificial lighting for scrubbing of noxious pollutants may be justified.

The use of this invention as an aquaria filter or for pollution scrubbing is dependent on incipient light levels. Studies to date have indicated that in the context of reef microcosm environment, approximately 6 g/m$^2$/day of dry algal biomass can be produced at a light level of 200 uE/m$^2$/sec with a nutrient level of 5 ug-at/1 (N-NO$_3$=). 12 g/m$^2$/day of dry algal material have been harvested at light levels of 500 uE/m$^2$/sec and nutrient levels of 1-2 ug-at/1 (N-NO$_3$=). Studies on actual productive reefs indicate that production of dry algal biomass is directly proportional to light intensity at levels up to 1200 uE/m$^2$/sec. At high light intensities and high nutrient levels of waste water an improvement in the order of 5-10 times the biomass yield occurs. This is in contrast to the best known algal agriculture system, for example, that reported in "Mass Production of Marine Algae in Outdoor Cultures", Nature, Volume 254, No. 5501, pp. 594-595 (1975). Accordingly, in the realm of pollution scrubbing, this invention finds direct utilization.

A third significant use of the present invention is in the production of biomass. As previously indicated, biomass production is a secondary benefit of pollution scrubbing of waste waters. Biomass fuels and particularly the potential for highly efficient algal turfs as a means for utilizing solar energy have not been explored in detail. Only recently, the use of biomass as a function of solar energy in an algal environment has been briefly recognized for example in "Photosynthetic Solar Energy: Rediscovering Biomass Fuels", Science, Vol. 197, pp. 745-746 (1979). Biomass production has been contemplated only in controlled environments and the use of techniques of algal production in open ocean environments has been largely unexplored. It is well known that dense algal turfs tend to accumulate about exposed structures such as buoys, barges, or boats and on driftwood in the open ocean. However, the mechanics of such a turf growth has been unexplored. The present invention utilizes the best environmental facets of an open ocean condition, constant surge motion, high light intensity for the production of biomass. By placing large screens on the ocean surface, ever present wave wash can be used to produce algal turf on such screens.

Figure 4A:
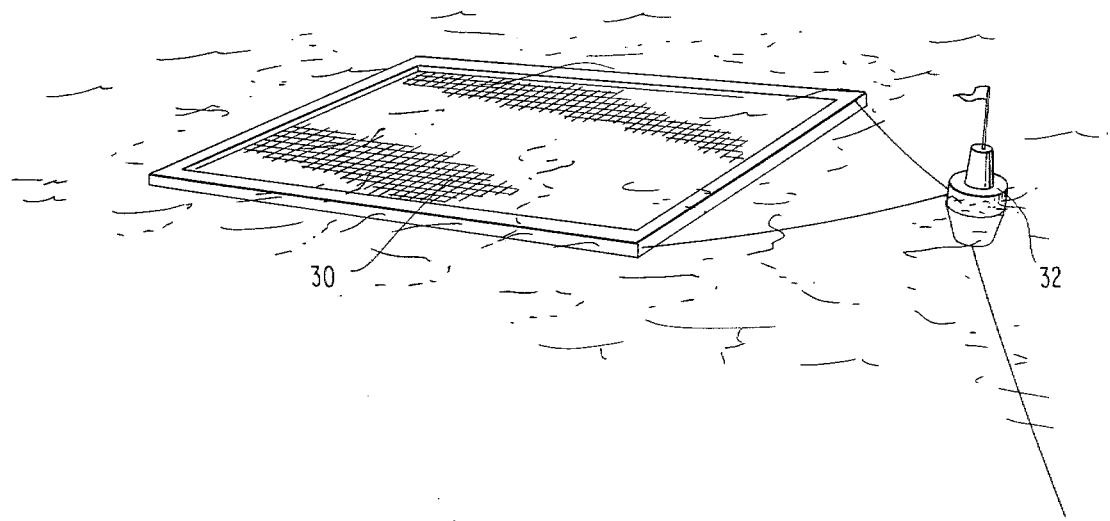
FIG. 4 shows a schematic system for biomass production utilizing ocean production plates.
Figure 4B:
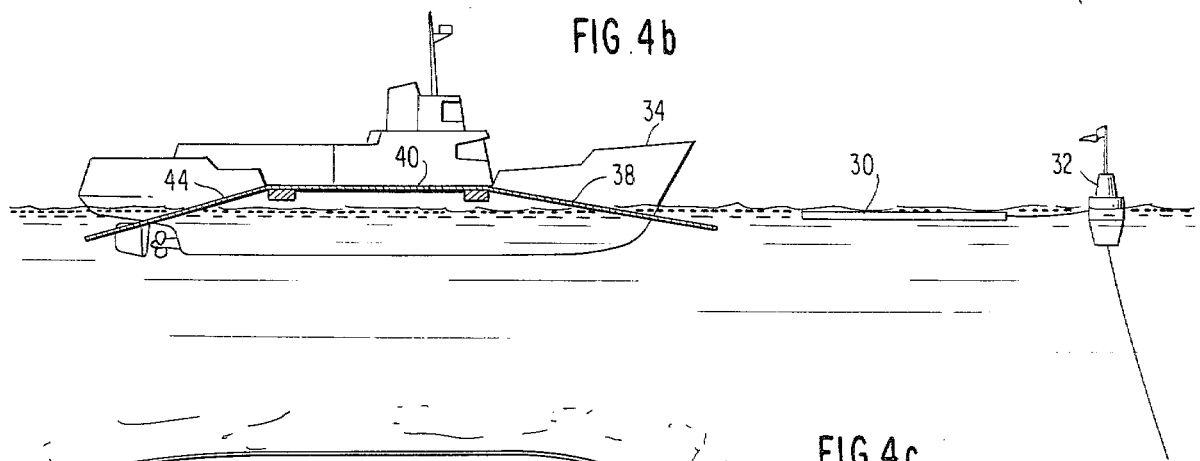
Figure 4C:
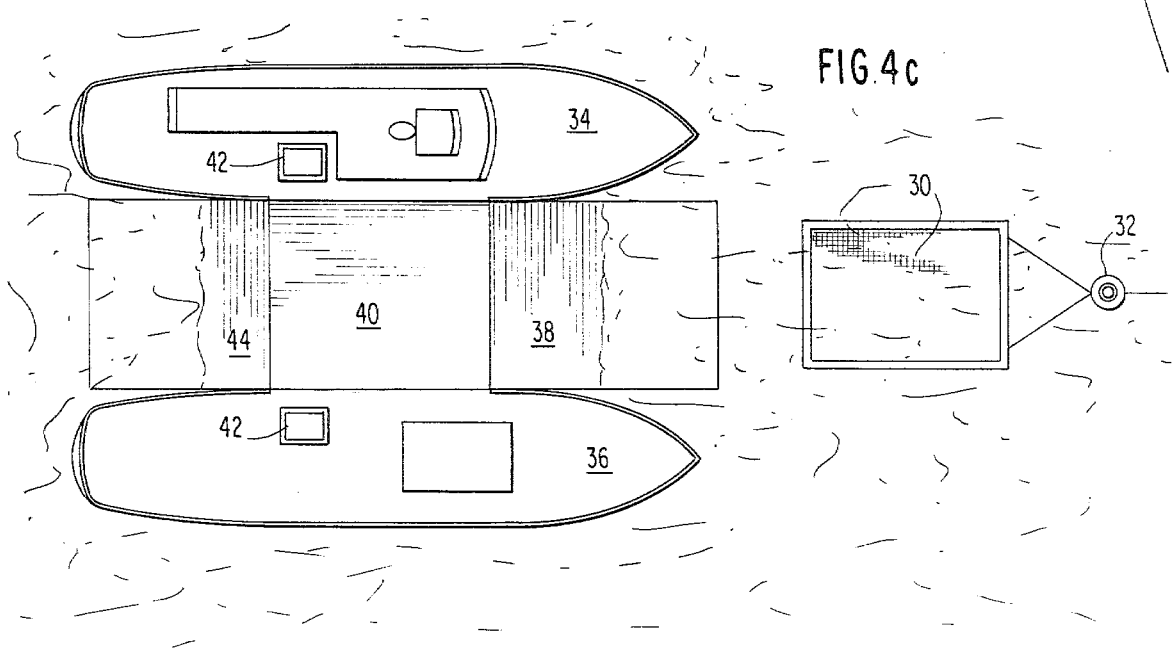

FIG. 4 shows the concept of utilizing a ply fiberglass or foam fiberglass screen moored on the ocean surface. Algal turf could be allowed to grow and harvested utilizing a catamaran type boat.

A production plate 30 is moored by means of buoy 32 and floating on the ocean surface. The plate 30 may be either a ply of fiberglass or a foam fiberglass mat having a grid size in the range of 0.5 to 5.0 mm. The plates are provided to allow spores of micro algal benthic algae to settle. The harvesting of the plates occurs before the turf becomes overgrown by macro algae. This keeps production at acceptably high levels and prevents predation by grazing microorganisms. Typically, algae of the Blue-Green type would be utilized and the production plates could be located in the tropical ocean environments now generally unused. FIG. 4b shows a catamaran-type boat having two hulls 34 and 36 with a central retrieval ramp 38. The ramp 38 is configured to accept the plate 30 which would simply be scooped up onto the retrieval ramp and the algal turf either mechanically or hand raked while the plate is located on a harvesting deck 40. The algal material which is raked from a plate is then stored in hatches 42 and the plate then released via ramp 44 where it is again attached to the mooring buoy 32. It is apparent that the size of the production plate is a function of overall system design which includes size of the harvesting vessel. Harvesting rates are a function of turf growth which would be monitored given average sunlight conditions. The harvesting craft would have the ability to scrub a large number of plates and remain at sea until the storage hatches were full. Accordingly, configuration of such vessels would take into account expected biomass production to allow for efficient harvesting at sea without requiring repetitive number of return trips to land. Such vessels would be optimized to scrub a number of plates which exist at a particular sea location fill their hatches and then return to port. Accordingly, optimization of the process includes optimizing the harvesting technique to eliminate unproductive trips to and from the harvesting areas.

It is apparent that other modifications and use of this invention will become apparent and may be practiced without departing from the essential novel aspects of this invention.

What is claimed is:

1. A method of producing an algal turf comprising the steps of:
   providing spores of benthic microalgae,
   providing a growing surface for spores of benthic microalgae,
   subjecting the growing surface to light to grow a benthic algal turf on said surface,
   subjecting the benthic microalgae on the growing surface to water surge motion to promote metabolite cellular-ambient water exchange and control the light reception on the turf so that said turf receives substantially uniform illumination, and
   periodically harvesting said benthic microalgae algal turf growing on said surface to remove a portion of the algae growing thereon prior to said turf being overgrown by macroalgae.

2. The method of claim 1 wherein in said harvesting step, filamentous bases of said algae remain on said surface following harvesting.

3. The method of claims 1 or 2 wherein said benthic microalgae are selected from the group consisting of:

| Green algae | Brown algae | Red algae | Blue-green algae |
| --- | --- | --- | --- |
| Bryopsis | Sphacelaria | Jania | Oscillatoria |
| Derbesia | Giffordia | Amphiroa | Schizothrix |

| Green algae | Brown algae | Red algae | Blue-green algae |
|---|---|---|---|
| | | Centroceras | Calothrix |
| | | Polysiphonia | Microcoleus |
| | | Gelidiella | |
| | | Ceramium | |
| | | Herposiphonia | |
| | | Lophosiphonia | |

4. The method of claims 1 or 2 wherein said growing surface comprises a porous mat having pore sizes in the range of 0.5 to 5.0 mm.

5. The method of claim 4 wherein said porous mat is a plastic glass roving screen.

6. The method of claims 1 or 2 further comprising the step of placing said growing surface on a water surface in a controlled environment and the step of providing water surge motion comprises the steps of periodically filling and emptying a water storage vessel to create surface wave motion in said controlled environment.

7. The method of claims 1 or 2 wherein said benthic microalgae are selected from the group consisting of:

| Green algae | Brown algae | Red algae | Blue-green algae | Diatoms |
|---|---|---|---|---|
| Enteromorpha | Ectocarpus | Acrohaetium | Oscillatoria | Licmophora |
| Ulva | Giffordia | Ceramium | Calothrix | Melosira |
| Chaetomorpha | Scytosiphon | Polysiphonia | | |
| Cladophora | | | | |

8. The method of claims 1 or 2 further comprising the step of placing said growing surface on the ocean surface.

9. The method of claim 7 wherein said step of periodically harvesting comprises the steps of placing said growing surface on a harvesting platform, removing algal turf growth and storing said removed growth on said platform and replacing said growing surface on the ocean surface.

* * * * *